(12) United States Patent  
Gless et al.

(10) Patent No.: US 9,343,717 B2  
(45) Date of Patent: May 17, 2016

(54) METHOD FOR PRODUCING BATTERY MODULES OR BATTERY SYSTEMS HAVING A PLURALITY OF BATTERY CELLS

(75) Inventors: Michael Gless, Stuttgart-Zazenhausen (DE); Ralf Angerbauer, Möglingen (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 13/813,900

(22) PCT Filed: Jun. 7, 2011

(86) PCT No.: PCT/EP2011/059376  
§ 371 (c)(1),  
(2), (4) Date: Apr. 8, 2013

(87) PCT Pub. No.: WO2012/016737  
PCT Pub. Date: Feb. 9, 2012

(65) Prior Publication Data  
US 2013/0209851 A1    Aug. 15, 2013

(30) Foreign Application Priority Data  
Aug. 4, 2010  (DE) .......................... 10 2010 038 862

(51) Int. Cl.  
*H01M 2/10*    (2006.01)  
*H01M 2/02*    (2006.01)  
(Continued)

(52) U.S. Cl.  
CPC ......... *H01M 2/1077* (2013.01); *B60L 11/1879* (2013.01); *H01M 2/024* (2013.01); *H01M 2/0262* (2013.01); *H01M 2/0277* (2013.01); *H01M 2/0285* (2013.01);  
(Continued)

(58) Field of Classification Search  
None  
See application file for complete search history.

(56) References Cited

U.S. PATENT DOCUMENTS

| 2,389,674 A | 11/1945 | MacFarland |
| 3,449,171 A | 6/1969 | Knight |

(Continued)

FOREIGN PATENT DOCUMENTS

| CN | 1776934 A | 5/2006 |
| CN | 1960920 A | 5/2007 |

(Continued)

OTHER PUBLICATIONS

Han, Jianhua, Chinese Office Action re. Application No. 201180037921.X, Serial No. 2014093001255710, Nov. 10, 2014 (2 pgs.).

(Continued)

*Primary Examiner* — Carlos Barcena  
*Assistant Examiner* — Wojciech Haske  
(74) *Attorney, Agent, or Firm* — Maginot, Moore & Beck LLP

(57) ABSTRACT

A method for producing battery modules or battery systems having a plurality of battery cells includes interconnecting and optionally arranging the battery cells with cell connectors to form the battery module or battery system architecture. The method also includes fitting the battery module or battery system with terminals and packaging all the battery cells of the battery module or system in a common plastic sheath by injection molding, so that the battery cells and cell connectors of the battery module or system are surrounded substantially completely by the plastic sheath. The battery module terminals or battery system terminals remain accessible from outside. A battery module or battery system can be produced in accordance with the method of the disclosure.

11 Claims, 1 Drawing Sheet

(51) Int. Cl.
*H01M 2/06* (2006.01)
*H01M 2/08* (2006.01)
*H01M 2/20* (2006.01)
*H01M 2/30* (2006.01)
*H01M 2/32* (2006.01)
*H01M 10/0525* (2010.01)
*H01M 10/058* (2010.01)
*B60L 11/18* (2006.01)
*H01M 10/653* (2014.01)
*H01M 10/617* (2014.01)
*H01M 10/613* (2014.01)

(52) U.S. Cl.
CPC ......... *H01M 2/0287* (2013.01); *H01M 2/0295* (2013.01); *H01M 2/06* (2013.01); *H01M 2/08* (2013.01); *H01M 2/1094* (2013.01); *H01M 2/206* (2013.01); *H01M 2/305* (2013.01); *H01M 2/32* (2013.01); *H01M 10/058* (2013.01); *H01M 10/0525* (2013.01); *H01M 10/613* (2015.04); *H01M 10/617* (2015.04); *H01M 10/653* (2015.04); *H01M 2220/20* (2013.01); *H01M 2250/20* (2013.01); *Y02E 60/122* (2013.01); *Y02P 70/54* (2015.11); *Y02T 10/7005* (2013.01); *Y02T 10/705* (2013.01); *Y02T 10/7011* (2013.01); *Y02T 90/32* (2013.01); *Y10T 29/4911* (2015.01)

(56) References Cited

U.S. PATENT DOCUMENTS

| | | | |
|---|---|---|---|
| 3,986,894 A | 10/1976 | Ciliberti, Jr. | |
| 4,826,944 A * | 5/1989 | Hoefer et al. | 528/49 |
| 5,567,284 A * | 10/1996 | Bauer | F03G 7/005 204/256 |
| 6,259,021 B1 * | 7/2001 | Fritsch et al. | 174/50 |
| 6,582,854 B1 * | 6/2003 | Qi et al. | 429/231.95 |
| 2003/0232248 A1 * | 12/2003 | Iwamoto | H01M 4/66 429/233 |
| 2004/0126660 A1 * | 7/2004 | Ohzuku et al. | 429/223 |
| 2005/0233206 A1 * | 10/2005 | Puttaiah et al. | 429/120 |
| 2006/0210870 A1 | 9/2006 | Moon et al. | |
| 2009/0081537 A1 | 3/2009 | Kim | |

FOREIGN PATENT DOCUMENTS

| | | |
|---|---|---|
| DE | 1 936 472 | 2/1971 |
| DE | 83 32 780 | 3/1984 |
| EP | 0 353 419 A1 | 2/1990 |
| EP | 1 895 610 A1 | 3/2008 |
| GB | 896 801 | 5/1962 |
| JP | 61-32348 A | 2/1986 |
| JP | 62-216146 A | 9/1987 |
| JP | 3-127443 A | 5/1991 |
| JP | 2002-245998 A | 8/2002 |
| JP | 2009-505348 A | 2/2009 |
| JP | 2013-518387 A | 5/2013 |

OTHER PUBLICATIONS

International Search Report corresponding to PCT Application No. PCT/EP2011/059376, mailed Feb. 21, 2012 (German and English language document) (7 pages).

\* cited by examiner

METHOD FOR PRODUCING BATTERY MODULES OR BATTERY SYSTEMS HAVING A PLURALITY OF BATTERY CELLS

This application is a 35 U.S.C. §371 National Stage Application of PCT/EP2011/059376, filed on Jun. 7, 2011, which claims the benefit of priority to Serial No. DE 10 2010 038 862.9, filed on Aug. 4, 2010 in Germany, the disclosures of which are incorporated herein by reference in their entirety.

The present disclosure relates to a method for producing battery modules or systems having a plurality of battery cells, and to battery modules or systems that are produced according to this method.

BACKGROUND

Battery modules or systems comprise rechargeable electrical energy storage devices, which are in widespread use in portable consumer goods and other applications, such as for example in partially or exclusively electrically driven motor vehicles. In automotive applications, battery modules and systems, and in particular lithium-ion battery modules or systems, are considered to be a key technology for electrifying the drive system of vehicles. For this purpose, battery modules and systems that have high capacities, preferably capacities of not less than 2 or 3 Ah, are needed. Such high-capacity battery modules and systems, and in particular lithium-ion battery modules and systems, are also constructed in a modular manner, according to the specification for their use, and comprise a plurality of battery cells electrically interconnected in series or parallel.

Among the important aspects for this technology to become successfully established is that these battery modules or systems can be produced at low cost and efficiently. A further aspect is that these battery modules or systems are as lightweight as possible, so that motor vehicles fitted with them and/or driven by them are restricted as little as possible in their performance capability.

Battery modules or systems described in the prior art, in particular high-capacity lithium-ion battery modules or systems, are produced by elaborate methods in which the individual components are usually in a form in which they are multiply packaged, in order to make adequate fixing, sealing and/or insulation of the constituent parts possible. As a result, the battery modules and systems obtained are expensive, inefficient to produce and relatively heavy.

SUMMARY

According to the disclosure, a method is provided for producing battery modules or battery systems having a plurality of battery cells, in particular high-capacity battery modules or systems, that reduces or overcomes one or more disadvantages of the prior art described.

The method according to the disclosure comprises in principle the following steps:
 providing a plurality of battery cells;
 interconnecting and optionally arranging the battery cells to form the battery module or battery system architecture by means of cell connectors;
 fitting battery-module or battery-system terminals;
 packaging all of the battery cells of the battery module or system in a common, optionally one-piece, plastic sheath by encapsulating injection-molding, so that the battery cells and cell connectors of the battery module or system are surrounded substantially completely by the plastic sheath, while the battery-module terminals or battery system terminals remain accessible from outside.

The method according to the disclosure has the effect that the battery cells of a battery module or system are in a form in which they are embedded in a common plastic sheath, so that the plastic sheath acts as a common housing of the battery module or system and it is no longer necessary for components to be additionally packaged in further separate housings, for example aluminum housings. The fact that the battery cells are in a form in which they are embedded in a common, optionally one-piece, plastic sheath means that the probability of production-related unsealed locations or leakages is reduced. The number of items and locations to check for leakage is likewise reduced, since there are no joints, welds or adhesive bonds. Consequently, the total number of parts to be assembled is reduced, the production costs are lowered and the probability of an error occurring in the method is lower. The complete encapsulation of both the individual battery cells and the cell connectors in a common plastic sheath also achieves a simplified and improved insulation of the cell potential.

The method according to the disclosure relates to the production of battery modules or battery systems having a plurality of battery cells. A battery module or battery system is understood here as meaning an arrangement for supplying a network or a load with electrical energy that comprises a battery with at least one electrochemical energy storage device. An energy storage device may be understood for the purposes of the present disclosure as meaning any energy storage device that stores energy by means of electrochemical processes. In particular, they should be understood as meaning energy storage devices that contain a plurality of battery cells and/or rechargeable battery cells connected in series and/or optionally also in parallel. The battery module or battery system preferably comprises battery cells of the lithium-ion cell type, in particular of the Li-ion—lithium-ion—battery, LiPo—lithium-polymer battery, LiFe—lithium-metal battery, Li—Mn—lithium-manganese battery, $LiFePO_4$—lithium-iron-phosphate battery or LiTi—lithium-titanate battery type. The battery module or battery system always has a plurality of battery cells that are combined to form a functional unit. For this purpose, the individual battery cells of the battery module or the battery system may be in a form in which they are connected electrically conductively to one another by means of cell connectors attached to the terminals in such a way that the desired battery module or battery system architecture is achieved. A battery system may have one or more battery modules.

Apart from a plurality of battery cells, a battery system may comprise further constituent parts, such as for example a cooling system, safety devices for switching off the battery system or for disconnecting the battery system from the rest of the network and/or a battery management system, which may comprise closed-loop and open-loop control units, which serve for the operation, controlled charging and discharging and safety monitoring of the battery.

The battery module or the battery system is preferably a lithium-ion battery module or system, in particular a lithium-ion battery module or system with a rated capacity of ≥2 Ah, preferably of ≥3 Ah.

In the method according to the disclosure, first a plurality of battery cells are provided. A battery cell usually has a coil, which encloses two electrodes separated by a separator layer. The two electrodes are in each case connected electrically conductively to a terminal that is accessible from outside. The battery cells may in each case be individually enclosed. For this purpose, the battery cells may, for example, in each case be in a form in which they are sealed in a plastic, surrounded by an aluminum foil and/or welded in a film, and be provided in this form.

A functional battery cell additionally has an electrolyte. For production and safety reasons, it is usually necessary in methods according to the prior art first to fit battery cells without an electrolyte and only fill the battery cells with the electrolyte after they have been assembled. In the method according to the disclosure, on the other hand, battery cells already charged with electrolyte may be provided and fitted. In particular, the battery cells of the battery module or system are filled with electrolyte before the packaging of the battery module or system. This is possible because, after packaging, the battery cells are enclosed by a sealed plastic sheath and there is consequently no longer any risk of electrolyte being released. Separate welding of the electrolyte filling openings of the battery cells is consequently likewise not necessary.

Once the battery cells have been provided, the battery cells are interconnected to form the desired battery module or battery system architecture and optionally arranged correspondingly. For this purpose, the terminals of the individual battery cells are connected electrically conductively to one another by means of cell connectors in such a way that the battery cells form a functional unit in the way desired. The function of the cell connectors is in this case to allow a suitable electrically conductive connection between the terminals of the battery cells. The cell connectors may be additionally configured in such a way that not only the interconnection but also a relative spatial arrangement of the individual battery cells with respect to one another can be achieved by means of the cell connectors. In this case it is not necessary for the cell connectors to ensure particularly stable, load-bearing spatial fixing of the battery cells with respect to one another, since the subsequent packaging of the battery cells to form the battery module or system by encapsulation with a plastic provides the required stability of the battery module or system. The shrinkage of the plastic after the injection-molding operation provides a prestress on the battery cells, so that a relative movement of the battery cells with respect to one another is further hindered and substantially prevented. This achieves the effect that there is no longer any necessity for additional fixing means such as screws or retaining straps that keep the battery cells in a predetermined spatial arrangement with respect to one another. Such fixing means can consequently be omitted. This allows the total weight of the battery module or system to be reduced significantly.

After the interconnection and optional suitable arrangement of the battery cells, the battery-module or battery-system terminals are fitted. These terminals form the electrically conductive connection to the outside, by way of which the battery module or system can be charged and/or discharged. These terminals represent the connecting points to the load or load network and are still accessible from outside even after packaging by encapsulation. In this case, the battery-module or battery-system terminals are connected to the terminals of the battery cells in such a way that they can be used for charging and/or discharging the battery cells of the battery module or system.

This is followed by the packaging of all of the battery cells of the battery module or system in a common, preferably one-piece, plastic sheath. The packaging is performed by encapsulation with a plastic. The encapsulation is preferably performed by an injection-molding process and is carried out in such a way that all of the battery cells and cell connectors of the battery module or system are surrounded substantially completely by the plastic sheath and are thus closed off from the surroundings in all directions. At the same time, it is ensured that the battery-module or battery-system terminals remain accessible from outside.

In a preferred variant of the method according to the disclosure, the packaging of the battery module or the battery system is performed by complete encapsulation in a single injection-molding operation, so as to create a common, one-piece plastic sheath which closes off the battery module or the battery system from the outside as a housing. This configuration achieves increased sealing integrity and improved insulation of the components of the battery module or system.

A plastic is used for the encapsulation. This plastic preferably has a low relative density, in particular a relative density (in relation to water under normal conditions) that is lower than the relative density of aluminum or of aluminum alloys, which are usually used in the production of battery or battery cell housings. This allows the total weight of the battery module or system to be reduced significantly. In particular, plastics which have a chemical resistance and resistance to corrosion that are superior to aluminum are used. A plastic or plastic mixture is preferably used for the encapsulation, the plastic preferably comprising polymers. Plastics or plastic mixtures which contain or consist of polymers that are selected from polyamide (PA), PA6, PA66, PA66/6, PA66/67, polypropylene (PP), polybutylene terephthalate (PBT), polyester (PES), polyaryl sulfones (PSU, PESU, PPSU), polyethylene terephthalate (PET), polyoxymethylene (POM) and/or polyurethane (PU/PUR) may be used in particular. The polymers may be reinforced, for example by glass fibers.

Examples of hotmelt adhesives (known as "hotmelts") that may be used are thermoplastic hotmelt adhesives based on polypropylene (PP) and/or polyethylene (PE) and/or reactive hotmelt adhesives, such as for example polyurethane (PU), epoxy resins and/or polyester resins (UP). The hotmelt adhesives may optionally be used in combination with glass fibers and/or carbon fibers.

Preferably used for the encapsulation are plastics or plastic mixtures that contain a filler which, when admixed, leads to an increase in the thermal conductivity of the plastic or plastic mixture. Examples of fillers that may be used are boron nitride (BN), aluminum nitride (AlN), aluminum oxide ($Al_2O_3$) and/or beryllium oxide (BeO) as well as mixtures thereof or containing one or more of the aforementioned fillers. These fillers are distinguished by a favorable thermal conductivity and the use of such fillers allows the thermal conductivity of the overall system to be increased. Boron nitride is distinguished by a particularly favorable thermal conductivity, while in the case of this filler the properties typical of plastics, such as low weight and very good electrical insulation, are retained. In addition, admixing boron nitride increases the abrasion resistance and the temperature resistance of the plastic sheath produced with it. Boron nitride in powder form is preferably used. Suitable boron nitride is obtainable under the trade name Boronid® from the company ESK Ceramics GmbH & Co. KG. The chemical inertness of boron nitride makes this filler highly compatible with virtually all commercially obtainable plastics. The low density of boron nitride means that the low density of the plastic or the plastic mixture is substantially retained in the mixture. The proportion of filler in the overall mixture for the plastic sheath may depend on the chosen plastic, filler and the specifications of the battery module or system. A person skilled in the art is able to determine suitable concentrations of filler in the overall mixture as a matter of routine.

Apart from the battery cells and the cell connectors, further constituent parts of the battery module or system may also be surrounded by the plastic sheath. These may be, for example, constituent parts of a cooling device. Further constituent parts may be in a form in which they are integrated in the plastic sheath. Thus, for example, fixing and/or fastening points, as well as holders or guides, for example for bracing plates or bracing straps, may be integrated or provided in the plastic sheath.

At least one safety valve may be integrated in the plastic sheath, so that, for example, an excess pressure inside the battery module or system can be dissipated to the surroundings. This safety valve may take the form of a predetermined breaking point, in particular this safety valve may be designed as a rupture disk.

The sealing of the battery-module or battery-system terminals may be achieved in the method according to the disclosure in a number of ways. Firstly, a sealing effect is achieved at the terminals just by using the shrinkage of the plastic after the encapsulation, in a way corresponding to the technique that is used when sealing or insulating electrical plugs. Alternatively or in addition, the battery-module or battery-system terminals may in each case be provided before the packaging with a sealing element, which is subsequently encapsulated. The pressure during the injection-molding and the subsequent shrinkage of the plastic cause the seals to be compressed and become media-impermeable. Such a sealing element may, for example, be configured as an insert component and joined on in a way corresponding to an O-ring seal. Such a sealing part may, however, also be joined on directly to the battery-module or battery-system terminals by means of a separate injection-molding operation with an elastomer.

The present disclosure also relates to a battery module or a battery system that has been produced or can be produced by a method according to the disclosure.

The present disclosure also comprises a motor vehicle that contains a battery module or battery system according to the disclosure. It is not essential here for the motor vehicle and the battery module or battery system to form a structural unit but for the motor vehicle and the battery module or battery system according to the disclosure to be functionally in contact in such a way that the battery module or the battery system can perform its function during the operation of the motor vehicle. In this case, the term "motor vehicle" should be understood as meaning all driven vehicles that have a battery module or battery system for supplying energy to at least one component of the motor vehicle, irrespective of what drives these motor vehicles have. In particular, the term "motor vehicle" covers HEVs (hybrid electric vehicles), PHEVs (plug-in hybrid electric vehicles), EVs (electric vehicles), fuel-cell vehicles as well as all vehicles that use a battery system to supply at least some of their electrical energy.

BRIEF DESCRIPTION OF THE DRAWINGS

Exemplary embodiments of the disclosure are explained in more detail on the basis of the description which follows and the drawings, in which.

DETAILED DESCRIPTION

Figure 1:
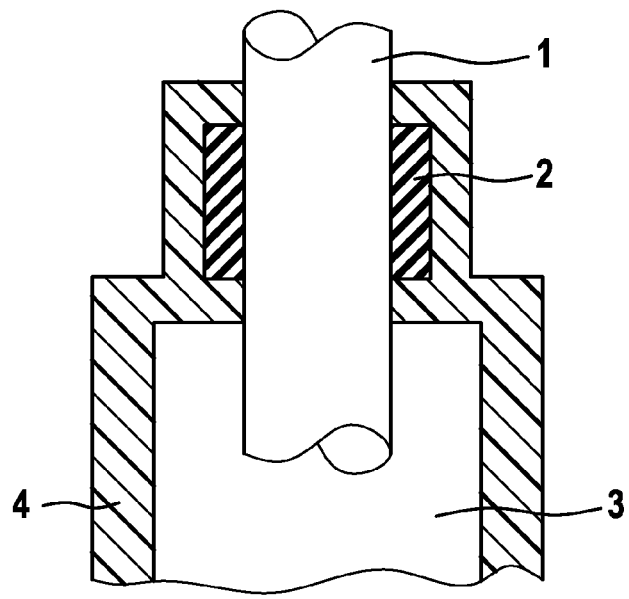
FIG. 1 shows a schematic representation of a longitudinal section through a terminal region of a battery module which has been produced by a method according to the disclosure.

In FIG. 1, a longitudinal section through a terminal region of a battery module which has been produced by a method according to the disclosure is schematically shown. In this case, the battery-module terminal 1 represented is surrounded by a sealing element 2. The terminal 1 is connected electrically conductively to one of the battery cells 3 of the battery module. After the packaging by encapsulation, both the battery cells 3 and the sealing element 2 of the battery module are surrounded by a common one-piece plastic sheath 4 and are insulated from the outside world.

Figure 2:
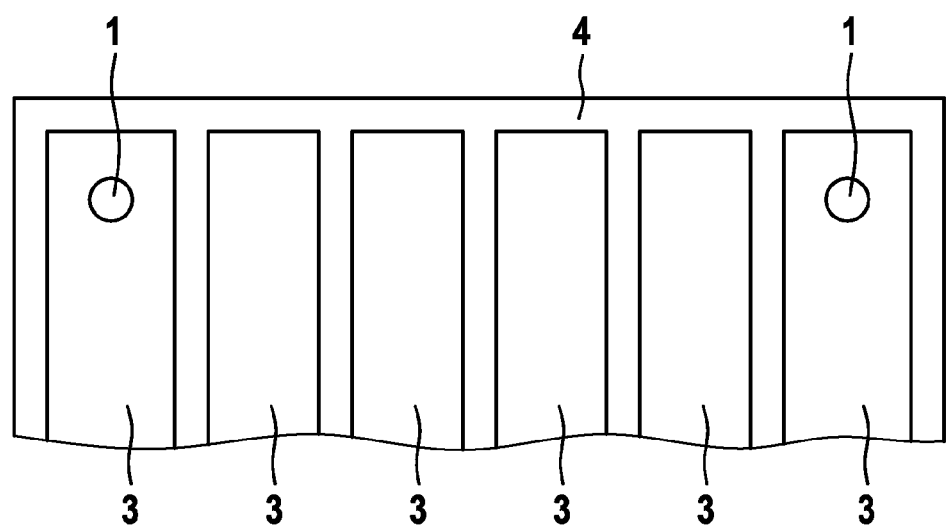
FIG. 2 shows a plan view of a horizontal sectional plane through a battery module which has been produced by a method according to the disclosure.

In FIG. 2 it is illustrated how a number of battery cells 3 of a battery module which has been produced by a method according to the disclosure are arranged after the packaging. It can be seen here that all of the battery cells 3 of the battery module are surrounded and held together by a common, one-piece plastic sheath 4. Only the battery-module terminals 1 protrude out of the plastic sheath 4, so that they are accessible from outside.

The invention claimed is:

1. A method for producing battery modules or battery systems having a plurality of battery cells, comprising:
   interconnecting battery cells of the plurality of battery cells with cell connectors to form one of a battery module architecture and a battery system architecture;
   fitting terminals to one of the battery module and the battery system; and
   packaging all of the battery cells in a common plastic sheath by encapsulating injection-molding, so that the battery cells and cell connectors are surrounded substantially completely by the plastic sheath, while the terminals remain accessible from outside the plastic sheath,
   wherein the plastic sheath formed by encapsulating injection molding comprises a plastic material and a filler admixed into the plastic material, the filler including at least one of boron nitride (BN), aluminum nitride (AlN), aluminum oxide (Al2O3) and beryllium oxide (BeO), and
   wherein at least one of the battery cells is individually enclosed by at least one of individually sealing with plastic, individually welding in film and individually surrounding by Al foil before interconnecting with cell connectors.

2. The method as claimed in claim 1, wherein the plastic material contains at least one of polyamide, polypropylene, polybutylene terephthalate, polyester, polyaryl sulfones, polyethylene terephthalate, polyoxymethylene and polyurethane.

3. The method as claimed in claim 1, wherein at least one of the battery cells is a lithium-ion battery cell.

4. The method as claimed in claim 1, further comprising filling the battery cells with electrolyte before packaging all of the battery cells.

5. The method as claimed in claim 1, further comprising applying a sealing element to each terminal before packaging all of the battery cells.

6. The method as claimed in claim 5, wherein:
   the sealing element is an insert component, and
   applying the sealing element includes inserting the sealing element.

7. The method as claimed in claim 5, further comprising joining the sealing element directly to the terminal by injection-molding with an elastomer.

8. The method as claimed in claim 1, wherein packaging all of the battery cells includes completely encapsulating all of the battery cells in a single injection-molding operation.

9. The method as claimed in claim 1, wherein the filler is used to increase thermal conductivity.

10. A battery module or battery system comprising:
    a plurality of battery cells;
    cell connectors configured to interconnect the battery cells of the plurality of battery cells to form one of a batter module architecture and a battery system architecture;
    terminals fitted onto one of the battery module and the battery system; and
    a common plastic sheath formed by encapsulating injection-molding and configured to package all of the battery cells such that the battery cells and the cell connectors are completely surrounded by and embedded in a plastic material while retaining access to the terminals from outside the plastic sheath, wherein the plastic material comprises a filler admixed into the plastic material, the filler including at least one of boron nitride (BN), aluminum nitride (AlN), aluminum oxide (Al2O3) and beryllium oxide (BeO), and wherein at least one of the battery cells is individually enclosed by at least one of individually sealing with plastic, individually welding in film and individually surrounding by Al foil before interconnecting with cell connectors.

11. A motor vehicle comprising:
one of a battery module and a battery system including:
   a plurality of battery cells;
   cell connectors configured to interconnect the battery cells of the plurality of battery cells to form one of a batter module architecture and a battery system architecture;
   terminals fitted onto one of the battery module and the battery system; and
   a common plastic sheath formed by encapsulating injection-molding and configured to package all of the battery cells such that the battery cells and the cell connectors are completely surrounded by and embedded in a plastic material while retaining access to the terminals from outside the plastic sheath, wherein the plastic material comprises a filler admixed into the plastic material, the filler including at least one of boron nitride (BN), aluminum nitride (AlN), aluminum oxide (Al2O3) and beryllium oxide (BeO), and wherein at least one of the battery cells is individually enclosed by at least one of individually sealing with plastic, individually welding in film and individually surrounding by Al foil before interconnecting with cell connectors.

* * * * *